United States Patent [19]
Tuday

[11] Patent Number: 5,846,160
[45] Date of Patent: Dec. 8, 1998

[54] POWER TRANSMISSION CONTROL

[75] Inventor: Thomas Tuday, Tecumseh, Mich.

[73] Assignee: General Motors Corporation, Detroit, Mich.

[21] Appl. No.: 683,942

[22] Filed: Jul. 19, 1996

[51] Int. Cl.⁶ .................................................. B60K 41/28
[52] U.S. Cl. ............................................... 477/99; 74/335
[58] Field of Search .......................... 477/99; 74/473.25, 74/335

[56]          References Cited

U.S. PATENT DOCUMENTS

| | | | |
|---|---|---|---|
| 4,425,620 | 1/1984 | Batcheller et al. | 477/99 X |
| 4,473,141 | 9/1984 | Mochida | 477/99 X |
| 4,650,048 | 3/1987 | Gregerson et al. | 477/99 X |
| 5,078,242 | 1/1992 | Ratke et al. | 477/99 X |
| 5,167,311 | 12/1992 | Satoh et al. | 74/335 X |
| 5,181,592 | 1/1993 | Pattock | 477/99 X |
| 5,338,907 | 8/1994 | Baker et al. | |
| 5,489,246 | 2/1996 | Moody et al. | 477/99 X |
| 5,562,568 | 10/1996 | Smale | 477/99 |

FOREIGN PATENT DOCUMENTS

WO 92/17719  10/1992  WIPO .

*Primary Examiner*—Dirk Wright
*Assistant Examiner*—Peter T. Kwon
*Attorney, Agent, or Firm*—Donald F. Scherer

[57]          ABSTRACT

A transmission control has a manual selector valve for distributing fluid pressure to various transmission elements. A linear voltage displacement transducer (LVDT) is coupled with the selector valve to provide a variable electrical signal through the range of movement of the selector valve. However, each selector position is described or defined by a discrete or distinct electrical signal from the LVDT. The LVDT electrical signal is directed to a powertrain control module (PCM) which processes the electrical signal to effect proper powertrain control.

2 Claims, 1 Drawing Sheet

POWER TRANSMISSION CONTROL

TECHNICAL FIELD

This invention relates to transmission controls, and more particularly, to transmission controls having electrical signals.

BACKGROUND OF THE INVENTION

Many of the present day powertrains having automatic shifting transmission gearing use electronically controlled mechanisms, such as solenoid valves, to establish the operating condition of the transmission. To this end, a plurality of electrical switches are employed. These switches control the electrical signal issuance necessary to inform the electronic control module (ECM) of the desired operational function. For example, the forward, reverse, neutral or park functions of the transmission can be indicated by a plurality of electrical switches are opened or closed in response to the positioning of the manual valve.

In order to establish each of the operating positions, usually four forward speeds, a reverse speed, a neutral condition, and a park condition, for the manual valve, three switches are required. If it is desired to provide positional information indicating movement between the operating positions, a fourth switch is required. The park and neutral positions are also used in the engine ignition circuit to permit engine starting, the reverse position is generally used to also operate a signal for illuminating the vehicle backup lights, and the park position interacts with the vehicle brakes to provide a brake transmission interlock (BTSI).

SUMMARY OF THE INVENTION

The present invention simplifies the position indicator mechanism through the use of a linear voltage displacement transducer (LVDT). The LVDT provides a voltage signal proportional to the linear displacement of a core member thereof relative to a fixed base portion. The LVDT has a moveable or displacement portion secured for movement with the manual selector valve, such that the output voltage or electrical signal is indicative of the position of the manual valve. The LVDT provides a further enhancement in that the voltage increases or decreases continuously, depending upon movement direction, between selector positions thereby indicating the manual valve condition at all times. This information is desirable for determining a pending change in transmission condition selection, for example, from forward to reverse or from neutral to either forward or reverse, or to indicate egress from or ingress to the park position, to name a few.

It is therefore an object of this invention to provide an improved powertrain control wherein an electrical signal is provided to indicate a manual valve operating position.

DESCRIPTION OF AN EXEMPLARY EMBODIMENT

Figure 1:
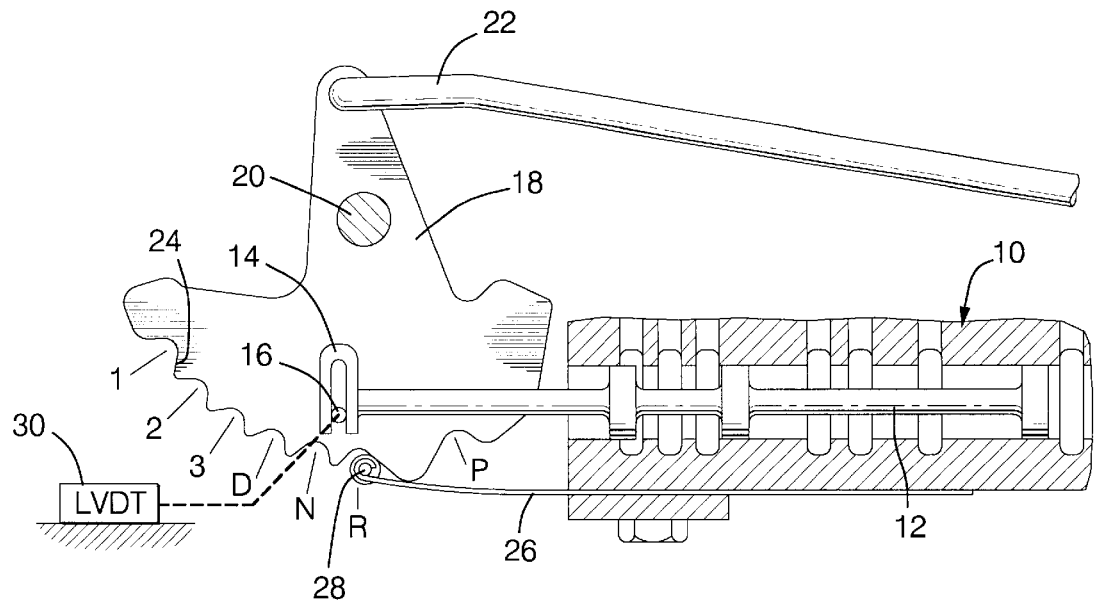
FIG. 1 is a diagrammatic representation of a portion of a transmission control incorporating the present invention.

There is seen in FIG. 1, a portion of a transmission control including a valve body 10 in which is slidably disposed a multi-land manual valve spool 12. The manual valve spool 12 is effective to direct fluid pressure through the valve body to various operating portions of the transmission in a well known manner. The manual valve 12 has a connecting portion 14 in which a pin 16 is disposed. The pin 16 is connected with a selector detent segment or rooster comb 18 which is fixedly mounted with a manual shaft 20.

The manual shaft 20 is connected in a well known manner to a manual control shift lever, such as a column mounted lever or a console mounted handle. The manual shaft 20 is manipulated by the operator when it is desired to change transmission operating conditions. The detent segment 18 is also connected with a rod member 22 which is connected with a conventional park mechanism, not shown.

The detent segment 18 has a plurality of recesses, such as 24, which indicate the operating conditions of the transmission. The operating conditions include park (P), reverse (R), neutral (N), drive (D), third gear (3), second gear (2) and low gear (1). The operating conditions of a transmission which accompany these selector positions are well known.

For example, in the "P" position, the transmission output shaft is generally selectively connected with a stationary portion of the transmission to prevent vehicle movement. In the "R" position, which is shown in FIG. 1, the transmission is conditioned to permit the operator to drive backward with the vehicle. In the "N" condition, the transmission is free to permit the vehicle to move forward or backward without power being applied to the wheels. In the "D" position, the transmission is conditioned to selectively automatically through a plurality of speed ratios, for example, four forward speed ratios.

In the "3" position, the transmission is conditioned for both engine braking and automatic three-speed shifting. Engine braking occurs when the operator relieves his foot from the accelerator pedal and permits the vehicle to coast. During coasting, the transmission will select a transmission ratio which is fixed between the engine and the rear wheels and will cause the vehicle to drive the engine thereby reducing the vehicle speed accordingly. The "2" position provides two-speed automatic shifting as well as engine braking. In the "2" position, the maximum forward ratio would be the second forward ratio and engine braking would be provided in the second ratio. In the "1" or low position, the vehicle transmission condition is fixed to the lowest ratio which provides engine braking at that low ratio. The "1" position provides the maximum engine braking condition.

The position of the selector detent segment 18 is resiliently held by a detent leaf spring 26 which has a roller portion 28 selectively engaged in the detent conditions "P" through "1" as desired or selected by the operator. The spring 26 provides the operator with a resistance when moving from one position to another and ensures that the manual valve will not wander from the position selected by the operator.

The pin 16 is also connected with a linear voltage displacement transducer 30. As is well known, linear voltage displacement transducers have a movable core member which is magnetically coupled with a stationary member to provide a voltage output signal proportional to the displacement of the core within the fixed housing.

Figure 2:
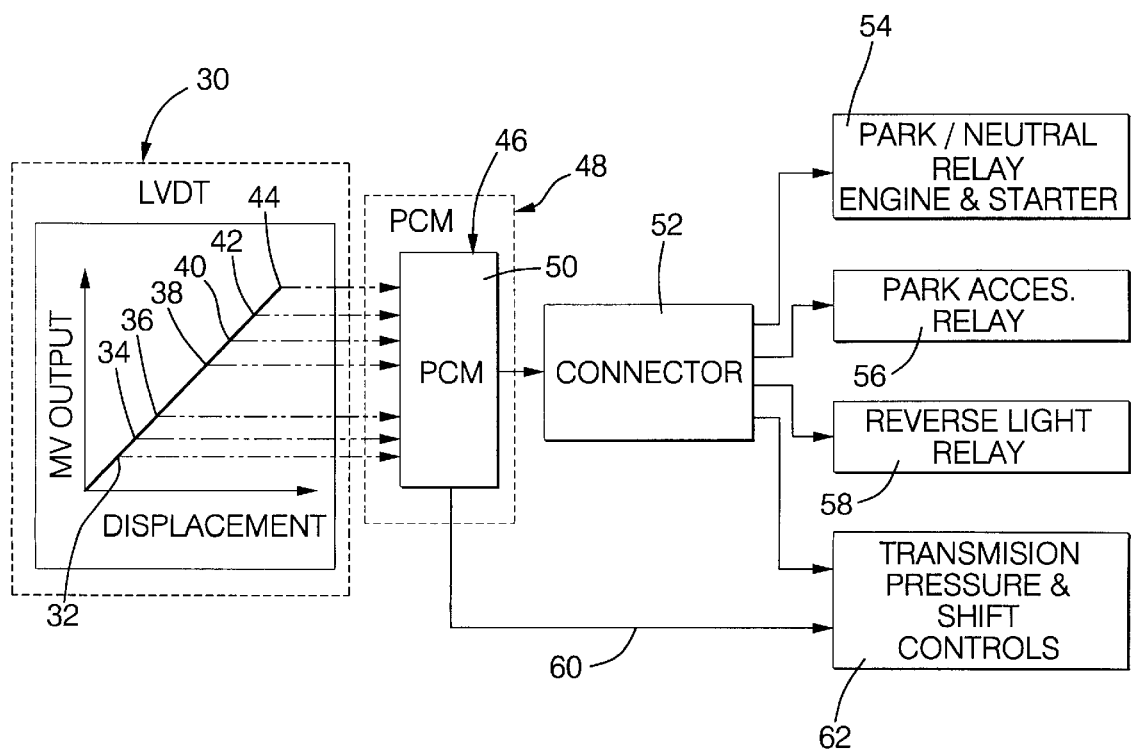
FIG. 2 is a schematic representation of a portion of an electrical control incorporating the present invention.

Shown in FIG. 2 is a curve of LVDT displacement versus voltage output. This is generally straight line relationship between voltage and displacement and therefore each individual position of the selector detent segment 18 will have a specific voltage output signal. The park position "P" will have a voltage output signal shown at 32, the reverse position "R" will have a voltage output signal shown at 34, the neutral condition "N" will have a voltage output signal shown at 36, the drive position "D" will have voltage output signal shown at 38, the "3", "2" and "1" positions will have respective voltage output signals shown at 40, 42 and 44.

The LVDT 30 also provides a continuous voltage change between adjacent positions. For example, when moving from park "P" to reverse "R", the voltage will continually increase. While moving in the opposite direction, the voltage will continually decrease. The same is true between any other two adjacent conditions selected.

The voltage output signals 32 through 44 are directed to a powertrain control module (PCM) generally designated 46. The PCM is a component within the larger electrical module which is the electronic control module (ECM) 48 for the entire vehicle, or portions thereof. The powertrain control module emits signals that will provide transmission and engine controls to be explained later. The PCM 46 generally includes a programmable computer portion which is operable to input the signals of the LVDT for processing and provide an output signal 50 to a conventional connector 52.

The connector 52 distributes the output signal 50 to a park/neutral relay mechanism 54, a park/accessory relay 56, and a reverse light/relay 58. The signals and their destination are determined by the PCM 46. The PCM 46 also distributes signals via wiring 60 to transmission pressure and shift controls 62. The signals for the transmission pressure and shift controls 62 are also received from the connector 52. Therefore, the signal emitted by the LVDT selected by the operator is directed to the transmission pressure and shift controls. The transmission pressure and shift controls 62 are conventional mechanisms which are well known in the art and it is not considered that a further description of these devices is needed.

The transmission pressure is determined by various operating conditions and is set by a regulator valve at a maximum level as required to provide the proper engagement of various friction devices within the transmission. The friction devices are engaged and disengaged to control the various speed ratios within the transmission. For example, during the low ratio, both a friction brake and a friction clutch might be engaged as might occur also in the second ratio. In the third ratio, it might be desirable to engage two clutches and provide a direct drive, while in the fourth forward ratio, it might be desirable to engage two clutches and provide a direct drive, while in the fourth forward ratio it might be desirable to engage one clutch and a friction device to provide an overdrive.

The reverse drive is generally accompanied or established by the engagement of the clutch and brake within the transmission to reverse the direction of rotation between the engine and the transmission output. The automatic shifting between ratios, when the vehicle forward drives are selected, is generally controlled by signals that are proportional to vehicle speed, engine speed and engine torque. It is also well known that the transmission shift controls will control the engagement and disengagement of a torque converter clutch for improved efficiency within the powertrain.

It is equally important that the PCM 46 be able to determine when the manual valve is held at a position intermediate any two adjacent drive conditions. For example, between neutral and reverse, or between drive and reverse, the PCM knowing the condition and which way the valve member is moving, can made some predetermination as to the pressure level required and the clutches and brakes to be engaged or disengaged. Likewise, the PCM can provide a signal which can indicate that the transmission selector valve is intermediate two signals or two conditions, such that a warning to the operator can be given so that proper adjustment can be made to the manual shaft 20.

The electrical signal from the park position "P" is also useful via the relay mechanism 54 in establishing the operation of a brake transmission interlock system (BTSI). These systems, as is well known, prevent the transmission from shifting from the park position prior to the engagement of the vehicle operating brakes or service brakes. Thus, the PCM would be given both a brake actuating signal, from the service brake, not shown, and a park signal, from relay 54, so that the proper control mechanisms can be actuated. It is also desirable when in the park position to permit removal of the ignition key if the ignition has been placed in the OFF position. Again, the signal of the park position, from relay 54, can provide control of the proper device, such as a solenoid, to permit key removal. The signals generated by the other operating conditions can likewise be used by the ignition system to prevent removal of the key.

It is also well known that the engine initial starting condition should only be permitted when the transmission is in park "P" or neutral "N". To that end, the PCM will only permit completion of the engine starting circuit by energizing proper components of the park/neutral relay 54 when either "P" or "N" is selected.

Thus, it should be apparent from the above description that the use of the LVDT 30 provides a significant advantage to the transmission in terms of control functions. The LVDT 30 will issue the appropriate signals to the PCM, such that the desired operating condition, as established by the operator through manipulation of the manual shaft 20, can be initiated. It is also considered that the LVDT 30 will require less space than the more conventional switch mechanisms which are utilized with electronic control systems.

What is claimed is:

1. A transmission control mechanism comprising:
    an operator controlled detent mechanism pivotally mounted on a transmission housing;
    a manual selector valve operatively connected with said detent plate and being selectively disposed for linear movement in a transmission valve body secured in the transmission housing;
    a linear voltage displacement transducer coupled with one of said detent plate and said selector valve for controlled movement thereby to selected operating positions including park, reverse and neutral, said linear voltage displacement transducer providing a continuously changing signal during said movement and repeatable distinct signals at said operating positions; and
    an electrical control system including an engine start circuit having means for receiving a signal from said linear voltage displacement transducer to permit completion of the start circuit when the linear voltage displacement transducer is in the neutral or park position.

2. A transmission control mechanism comprising:

an operator controlled detent mechanism pivotally mounted on a transmission housing;

a manual selector valve operatively connected with said detent plate and being selectively disposed for linear movement in a transmission valve body secured in the transmission housing;

a linear voltage displacement transducer coupled with one of said detent plate and said selector valve for controlled movement thereby to selected operating positions including park, reverse and neutral, said linear voltage displacement transducer providing a continuously changing signal during said movement and repeatable distinct signals at said operating positions; and an electrical control system including operating condition circuits having means for receiving a signal from said linear voltage displacement transducer to permit completion of a circuit to enable a desired operating condition when the linear voltage displacement transducer is in an appropriate position.

* * * * *